(12) United States Patent
Otomo (10) Patent No.: US 11,313,232 B2
(45) Date of Patent: Apr. 26, 2022

(54) TURBINE BLADE, TURBINE, AND METHOD FOR COOLING TURBINE BLADE

(71) Applicant: Mitsubishi Hitachi Power Systems, Ltd., Kanagawa (JP)

(72) Inventor: Hiroyuki Otomo, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 154 days.

(21) Appl. No.: 16/491,430

(22) PCT Filed: Feb. 26, 2018

(86) PCT No.: PCT/JP2018/006900
§ 371 (c)(1),
(2) Date: Sep. 5, 2019

(87) PCT Pub. No.: WO2018/163877
PCT Pub. Date: Sep. 13, 2018

(65) Prior Publication Data
US 2020/0018170 A1     Jan. 16, 2020

(30) Foreign Application Priority Data
Mar. 10, 2017   (JP) .............................. JP2017-046430

(51) Int. Cl.
*F01D 5/18*     (2006.01)
*F01D 25/12*    (2006.01)
(Continued)

(52) U.S. Cl.
CPC ............... *F01D 5/18* (2013.01); *F01D 25/12* (2013.01); *F02C 3/04* (2013.01); *F02C 7/18* (2013.01);
(Continued)

(58) Field of Classification Search
CPC ..... F01D 5/18; F01D 25/12; F02C 3/04; F02C 7/18; F05D 2240/81; F05D 2260/232
See application file for complete search history.

(56) References Cited

U.S. PATENT DOCUMENTS 6,227,804 B1   5/2001   Koga et al.
6,273,682 B1   8/2001   Lee
(Continued)

FOREIGN PATENT DOCUMENTS

CN   101210498   7/2008
CN   107084001   8/2017
(Continued)

OTHER PUBLICATIONS

International Search Report dated Apr. 17, 2018 in International (PCT) Application No. PCT/JP2018/006900 with English translation.
(Continued)

*Primary Examiner* — Aaron R Eastman
(74) *Attorney, Agent, or Firm* — Wenderoth, Lind & Ponack, L.L.P.

(57) ABSTRACT

A turbine blade includes a blade main body that includes a cooling flow path formed inside, through which a cooling medium flows; and a plurality of turbulators that are aligned in a flow direction of the cooling medium, project into the cooling flow path from an inner surface of the blade main body, and extend in a direction intersecting with the flow direction. At least one of the turbulators is a first turbulator. The first turbulator includes a first portion and a second portion. The first portion is connected to the first portion and has a projecting height from the inner surface that changes at a first change ratio along a direction intersecting with the flow direction. The second portion has a projecting height from the inner surface that changes at a second change ratio
(Continued)

higher than the first change ratio along the direction intersecting with the flow direction.

12 Claims, 6 Drawing Sheets

(51) Int. Cl.
    *F02C 3/04*     (2006.01)
    *F02C 7/18*     (2006.01)

(52) U.S. Cl.
    CPC .... *F05D 2240/81* (2013.01); *F05D 2260/232* (2013.01)

(56) References Cited

U.S. PATENT DOCUMENTS

| | | | |
|---|---|---|---|
| 8,876,475 B1* | 11/2014 | Liang | F01D 5/187 416/97 R |
| 2004/0208744 A1* | 10/2004 | Shi | F01D 9/041 416/97 R |
| 2008/0159874 A1 | 7/2008 | Pietraszkiewicz et al. | |
| 2016/0069194 A1* | 3/2016 | Bommisetty | B23P 15/02 416/96 R |
| 2016/0177738 A1 | 6/2016 | Moore et al. | |
| 2016/0319671 A1* | 11/2016 | Benson | F01D 5/187 |
| 2017/0096900 A1* | 4/2017 | Bunker | F01D 5/145 |
| 2017/0234140 A1* | 8/2017 | Bunker | F01D 25/12 415/208.1 |
| 2019/0211690 A1* | 7/2019 | LoRicco | F01D 9/065 |

FOREIGN PATENT DOCUMENTS

| | | |
|---|---|---|
| DE | 699 36 243 | 2/2008 |
| DE | 600 37 927 | 1/2009 |
| EP | 2 599 957 | 6/2013 |
| JP | 2001-152802 | 6/2001 |
| JP | 2004-316654 | 11/2004 |
| KR | 10-2011-0097276 | 8/2011 |

OTHER PUBLICATIONS

Written Opinion of the International Searching Authority dated Apr. 17, 2018 in International (PCT) Application No. PCT/JP2018/006900 with English translation.
Office Action dated May 13, 2021 in corresponding Chinese Patent Application No. 201880016619.8, with English Translation.
Office Action dated Feb. 28, 2022 in corresponding German Patent Application No. 112018001275.1, with English translation, 14 pages.

* cited by examiner

TURBINE BLADE, TURBINE, AND METHOD FOR COOLING TURBINE BLADE

FIELD

The present invention relates to a turbine blade, a turbine, and a method for cooling a turbine blade.

BACKGROUND

A gas turbine includes a compressor that generates high-pressure air, a combustor that generates combustion gas by mixing the high-pressure air with fuel for combustion, and a turbine that is driven by the combustion gas. Among these components, the turbine includes a rotor main body that is rotated, a plurality of turbine blades that are provided on the rotor main body, and a casing that covers the rotor main body and the turbine blades from the outer circumferential side and in which a plurality of turbine vanes are provided along an inner circumferential surface thereof. When the combustion gas collides with the turbine blades, energy of the combustion gas is converted into rotating energy of the rotor main body. The turbine blades located on the high-pressure side are exposed to the high-temperature and high-pressure combustion gas, so that the turbine blades need to be cooled. A technique described in Patent Literature 1 is an example of a technique for cooling the turbine blades.

In a device described in Patent Literature 1, a cooling flow path for flowing cooling air is formed in the turbine blade. A plurality of turbulators aligned at intervals in the flow direction of the cooling air are provided in the cooling flow path. The turbulators are projections provided on the inner surface of the cooling flow path. To be more specific, the turbulators have plate shapes extending along the inner surface of the turbine blade having a blade cross-sectional shape.

CITATION LIST

Patent Literature

Patent Literature 1: Japanese Patent Application Laid-open No. 2001-152802

SUMMARY

Technical Problem

The turbine blade has the configuration in which the turbulators are provided in the cooling flow path therein and the cooling air collides with the turbulators to cause flow of the cooling air to be disturbed. With this configuration, heat transmission efficiency between the turbine blade and the cooling air can be improved and the turbine blade can be cooled efficiently. The turbulators have projecting shapes installed in the path through which the cooling air flows. Portions with low strength in the turbulators having the projecting shapes can lower durability as the turbine blade. When the turbulators with low durability are included, durability as the turbine blade is lowered even with the turbulators capable of efficient cooling.

The present invention has been made to solve the above-mentioned problem and an object thereof is to provide a turbine blade with improved strength, a turbine including the turbine blade, and a method for cooling a turbine blade.

Solution to Problem

A turbine blade according to the present invention includes a blade main body that includes a cooling flow path formed inside, through which a cooling medium flows; and a plurality of turbulators that are aligned in a flow direction of the cooling medium, project into the cooling flow path from an inner surface of the blade main body, and extend in a direction intersecting with the flow direction. At least one of the turbulators is a first turbulator. The first turbulator includes a first portion and a second portion. The first portion has a projecting height from the inner surface that changes at a first change ratio along a direction intersecting with the flow direction. The second portion has a connection point at which one end of the second portion is connected to the first portion and having a projecting height from the inner surface that changes at a second change ratio higher than the first change ratio along the direction intersecting with the flow direction.

With this configuration, the projecting height of the second portion from the inner surface gradually changes along the direction intersecting with the flow direction, so that no corner portion is formed on the turbulator. Stress concentration on the turbulator can thereby be reduced.

In the turbine blade according to the present invention, the first change ratio of the first portion may be 0.

With this configuration, the stress concentration on the turbulator can be further reduced.

In the turbine blade according to the present invention, the projecting height of the second portion may decrease as being farther from the first portion.

With this configuration, the projecting height of the second portion decreases as being farther from the first portion, so that the stress concentration on the turbulator can be further reduced.

In the turbine blade according to the present invention, an edge of the second portion on a side opposite to the inner surface may form a circular arc shape being tangent to the inner surface when seen from the flow direction.

With this configuration, the stress concentration on the turbulator can be further reduced.

In the turbine blade according to the present invention, the first portion and the second portion of the first turbulator may be connected to each other in a curved form.

With this configuration, the first portion and the second portion are connected in the curved form and no corner portion is therefore formed on the connected portion. The stress concentration on the turbulator can thereby be reduced.

In the turbine blade according to the present invention, the first turbulator may be the turbulator located at a position closest to one side in the flow direction among the turbulators.

There are cases where a cutout is formed in the turbulator located at the position closest to the one side in the flow direction, that is, at the innermost side in the radial direction of the turbine among the turbulators because of limitations on a manufacturing process. With the above-mentioned configuration, the cutout can be formed without forming no corner portion on the turbulator, so that the stress concentration on the turbulator can be reduced and the limitations on the manufacturing process can also be satisfied.

In the turbine blade according to the present invention, second turbulators other than the first turbulator among the turbulators each may have a constant projecting height from the inner surface along the direction intersecting with the flow direction.

With this configuration, the second turbulators can sufficiently cool the blade main body.

In the turbine blade according to the present invention, edges of the first turbulator and each of the second turbulators on the inner surface side may be parallel to each other and edges of the first turbulator and each of the second turbulators on a side farther from the inner surface may be not parallel to each other.

With this configuration, the second turbulators can sufficiently cool the blade main body.

In the turbine blade according to the present invention, the blade main body may include a plurality of partition walls dividing the cooling flow path into a plurality of cavities, and both ends of each of the second turbulators other than the first turbulator among the turbulators may be connected to the partition walls, to the partition wall and the inner surface of the blade main body on a leading edge side, or to the partition wall and the inner surface on a trailing edge side.

With this configuration, the second turbulators can sufficiently cool the blade main body.

In the turbine blade according to the present invention, the blade main body may include a plurality of partition walls dividing the cooling flow path into a plurality of cavities, the partition walls may include a first partition wall close to the first portion and a second partition wall close to the second portion, and a distance between the second partition wall and the second portion may be larger than half of a distance between the first partition wall and the connection point.

With this configuration, the second turbulators can sufficiently cool the blade main body.

In the turbine blade according to the present invention, the blade main body may include a gas path face defining member that defines a gas path face which is a radial face of a gas path. The second portion may be close to the gas path face defining member.

With this configuration, the second turbulators can sufficiently cool the blade main body.

In the turbine blade according to the present invention, the blade main body may include another cooling flow path including no first turbulator, and at least a portion of the turbulator in the other cooling flow path may be located at a position on an inner side in a radial direction relative to a gas path face which is a radial face of a gas path.

With this configuration, the second turbulators can sufficiently cool the blade main body.

In the turbine blade according to the present invention, a plurality of cooling holes communicating the cooling flow path and an outer surface may be formed in at least a part of the blade main body, and the first turbulator may be the turbulator provided at a position overlapping with the cooling holes.

There are cases where a cutout is formed in the turbulator provided at the position overlapping with the cooling holes in order to prevent the turbulator and the cooling holes from interfering with each other. With the above-mentioned configuration, the cutout can be formed without forming no corner portion on the turbulator, so that the stress concentration on the turbulator can be reduced and the turbine blade can be cooled through the cooling holes.

A turbine according to the present invention includes a rotor main body that rotates about an axial line; the above-described turbine blade that is provided on the rotor main body; and a casing that covers the rotor main body from an outer circumferential side to form a fluid flow path. The first portion of the first turbulator overlaps with the fluid flow path and at least a part of the second portion of the first turbulator does not overlap with the fluid flow path when seen from the direction intersecting with the flow direction.

With this configuration, only the first portion of the turbulator is provided at a position overlapping with the fluid flow path. That is to say, the first portion of the turbulator is located in a portion that needs to be positively cooled because the portion overlaps with the fluid flow path. The cooling effect by the turbulator can be sufficiently ensured and the stress concentration on the turbulator can be reduced.

A method according to the present invention is for cooling a turbine blade. The turbine blade includes a blade main body that includes a cooling flow path formed inside, through which a cooling medium flows; and a plurality of turbulators that are aligned in a flow direction of the cooling medium, project into the cooling flow path from an inner surface of the blade main body, and extend in a direction intersecting with the flow direction. At least one of the turbulators is a first turbulator. The first turbulator includes a first portion and a second portion. The first portion has a projecting height from the inner surface that changes at a first change ratio along a direction intersecting with the flow direction. The second portion has a connection point at which one end of the second portion is connected to the first portion and having a projecting height from the inner side that changes at a second change ratio higher than the first change ratio along the direction intersecting with the flow direction. The method includes cooling the blade main body by causing cooling air to flow through the cooling flow path; and performing heat exchange between the blade main body and the cooling air while changing a flow direction of the cooling air by the first turbulator and second turbulators other than the first turbulator, to cool the turbine blade.

With this method, the strength of the turbine blade can be sufficiently improved and the turbine blade can be efficiently cooled.

Advantageous Effects of Invention

The present invention can provide a turbine blade and a turbine having sufficient strength.

DESCRIPTION OF EMBODIMENTS

First Embodiment

Hereinafter, a preferred embodiment of the present invention will be described in detail with reference to the accompanying drawings. It should be noted that the embodiment does not limit the present invention, and when there are a plurality of embodiments, the present invention encompasses combinations of the embodiments.

Figure 1:
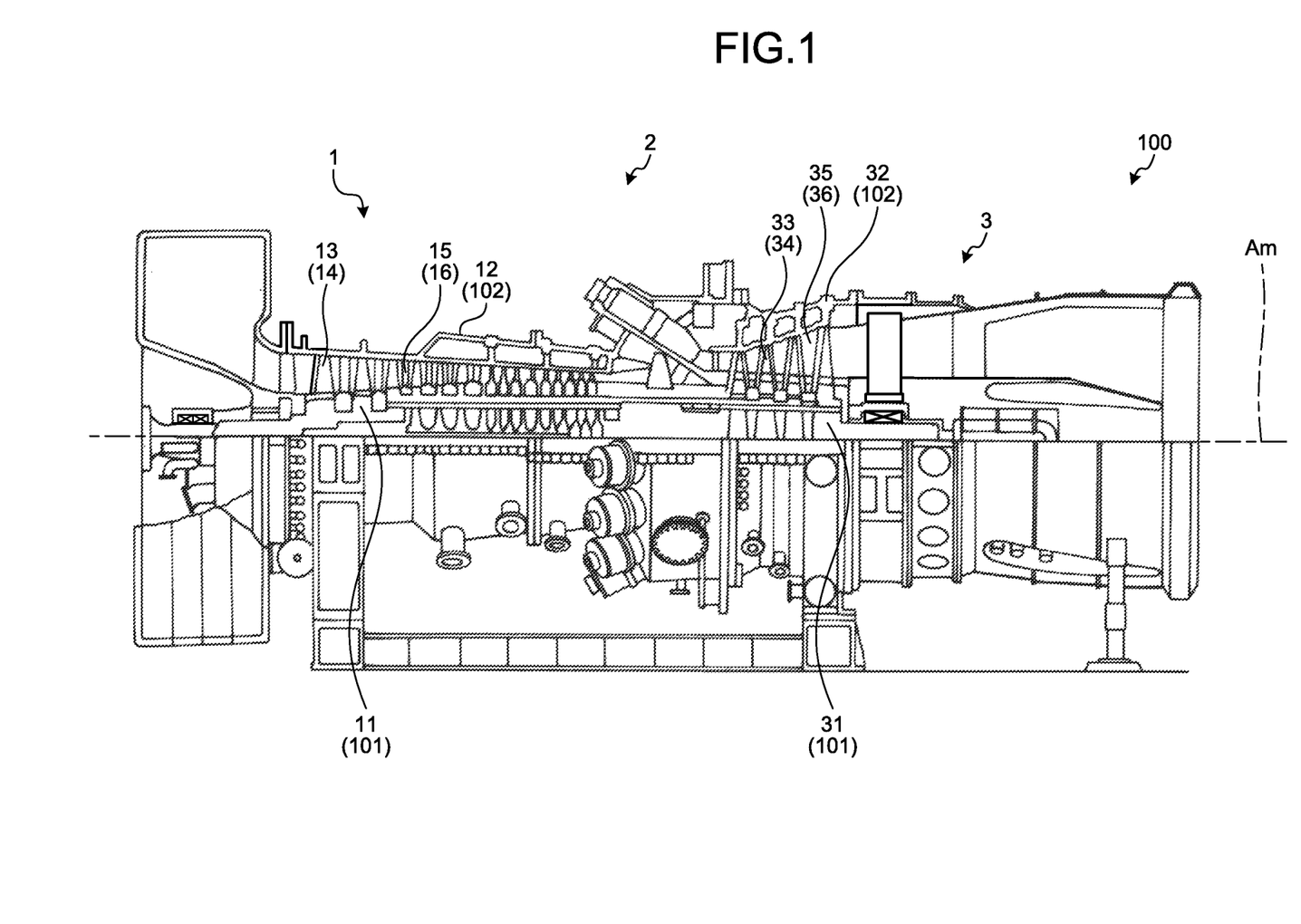
FIG. 1 is a cross-sectional view illustrating the configuration of a turbine according to each embodiment of the present invention.

As illustrated in FIG. 1, a gas turbine 100 according to the embodiment includes a compressor 1 that generates high-pressure air, a combustor 2 that generates combustion gas by mixing the high-pressure air with fuel for combustion, and a turbine 3 that is driven by the combustion gas.

The compressor 1 includes a compressor rotor 11 that rotates about an axial line Am and a compressor casing 12 that covers the compressor rotor 11 from the outer circumferential side. The compressor rotor 11 has a columnar shape extending along the axial line Am. A plurality of compressor blade stages 13 aligned at intervals in the axial line Am direction are provided on the outer circumferential surface of the compressor rotor 11. Each of the compressor blade stages 13 has a plurality of compressor blades 14 aligned at intervals in the circumferential direction of the axial line Am on the outer circumferential surface of the compressor rotor 11.

The compressor casing 12 has a cylindrical shape about the axial line Am as a center. A plurality of compressor vane stages 15 aligned at intervals in the axial line Am direction are provided on the inner circumferential surface of the compressor casing 12. These compressor vane stages 15 are aligned alternately with the above-mentioned compressor blade stages 13 when seen from the axial line Am direction. Each of the compressor vane stages 15 has a plurality of compressor vanes 16 aligned at intervals in the circumferential direction of the axial line Am on the inner circumferential surface of the compressor casing 12.

The combustor 2 is provided between the above-mentioned compressor casing 12 and a turbine casing 32, which will be described later. The high-pressure air generated by the compressor 1 becomes premixed gas by being mixed with the fuel in the combustor 2. Combustion of the premixed gas in the combustor 2 generates high-temperature and high-pressure combustion gas. The combustion gas is guided into the turbine casing 32 to drive the turbine 3.

The turbine 3 includes a turbine rotor 31 that rotates about the axial line Am and the turbine casing 32 that covers the turbine rotor 31 from the outer circumferential side. The turbine rotor 31 has a columnar shape extending along the axial line Am. A plurality of turbine blade stages 33 aligned at intervals in the axial line Am direction are provided on the outer circumferential surface of the turbine rotor 31. Each of the turbine blade stages 33 has a plurality of turbine blades 34 aligned at intervals in the circumferential direction of the axial line Am on the outer circumferential surface of the turbine rotor 31. The turbine rotor 31 is integrally coupled to the above-mentioned compressor rotor 11 in the axial line Am direction to form a gas turbine rotor 101.

The turbine casing 32 has a cylindrical shape about the axial line Am as a center. A plurality of turbine vane stages 35 aligned at intervals in the axial line Am direction are provided on the inner circumferential surface of the turbine casing 32. These turbine vane stages 35 are aligned alternately with the above-mentioned turbine blade stages 33 when seen from the axial line Am direction. Each of the turbine vane stages 35 has a plurality of turbine vanes 36 aligned at intervals in the circumferential direction of the axial line Am on the inner circumferential surface of the turbine casing 32. The turbine casing 32 is coupled to the above-mentioned compressor casing 12 in the axial line Am direction to form a gas turbine casing 102. That is to say, the above-mentioned gas turbine rotor 101 can rotate integrally about the axial line Am in the gas turbine casing 102. A fluid flow path A extending along the axial line Am is formed between the gas turbine casing 102 and the gas turbine rotor 101. Working fluid such as the above-mentioned compressed air and combustion gas flows along the fluid flow path A. Most of the parts of the compressor blades 14 and the turbine blades 34 that include end portions thereof on the outer side in the radial direction are exposed into the fluid flow path A.

Subsequently, the detail configuration of the turbine blades 34 will be described. Hereinafter, the turbine blades 34 of, among the turbine blade stages 33, the second and subsequent turbine blade stages 33 from the upstream side will be described.

Figure 2:
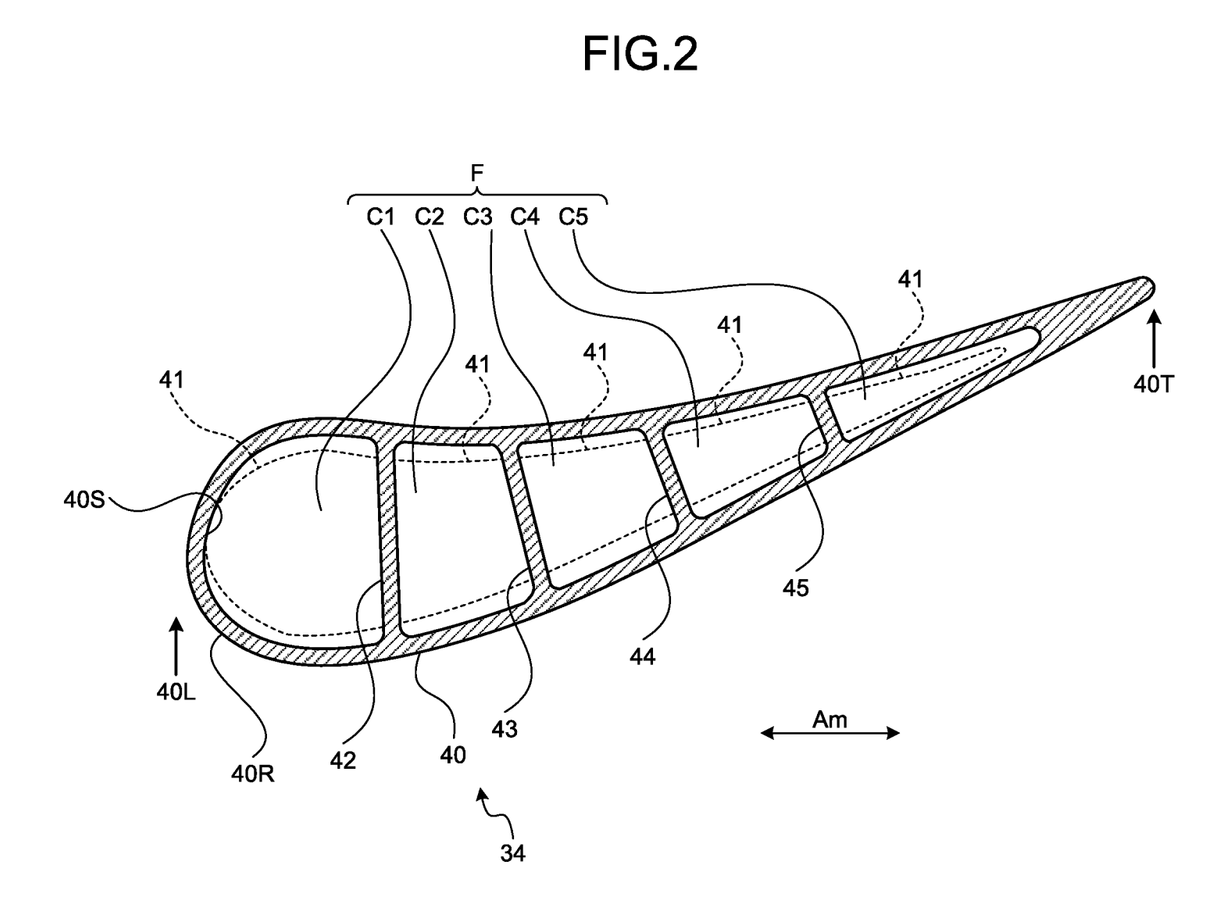
FIG. 2 is a cross-sectional view illustrating the configuration of a turbine blade according to a first embodiment of the present invention.
Figure 3:
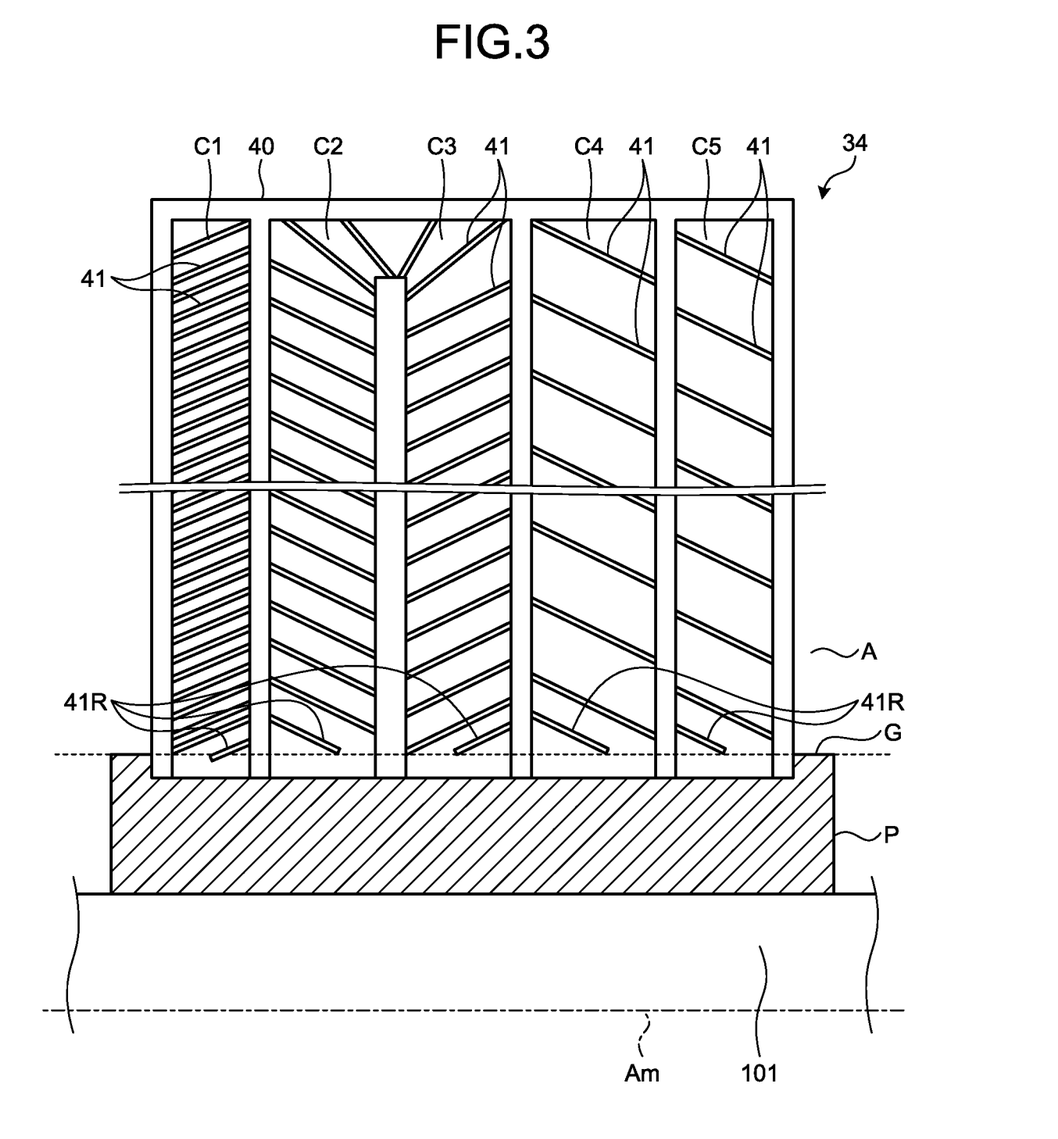
FIG. 3 is another cross-sectional view illustrating the configuration of the turbine blade according to the first embodiment of the present invention.

Each turbine blade 34 extends along the radial direction of the axial line Am from the outer circumferential surface of the turbine rotor 31. As illustrated in FIGS. 2 and 3, the turbine blade 34 has a blade cross-sectional shape when seen from the radial direction of the axial line Am. To be specific, the turbine blade 34 has a cylindrical blade main body 40 extending in the radial direction and a platform P serving as a gas path face defining member that supports the blade main body 40 from the inner side in the radial direction. As the gas path face defining member, an inner shroud or an outer shroud of the turbine vane 36 can be applied instead of the platform P. The inside of the blade main body 40 of the turbine blade 34 is divided into a plurality of cavities. A plurality of turbulators 41 are formed inside the cavities of the turbine blade 34. The platform P defines a gas path face G as a face of the fluid flow path A on the outer side in the radial direction.

Of both end portions of the blade main body 40 in the axial line Am direction, a leading edge 40L formed to have a curved cross section faces the upstream side which is one side in the axial line Am direction. A trailing edge 40T of the blade main body 40 on the side opposite to the leading edge 40L faces the downstream side which is the other side in the axial line Am direction.

The inside of the blade main body 40 is divided into five cavities by four partition walls 42, 43, 44, and 45. In the following description, the cavities may be referred to as a first cavity C1, a second cavity C2, a third cavity C3, a fourth cavity C4, and a fifth cavity C5 in the order from the leading edge 40L side toward the trailing edge 40T side of the blade main body 40. The high-pressure air supplied from the compressor 1 flows as the cooling air in the first cavity C1, the second cavity C2, the third cavity C3, the fourth cavity C4, and the fifth cavity C5. That is to say, the first cavity C1, the second cavity C2, the third cavity C3, the fourth cavity C4, and the fifth cavity C5 function as a cooling flow path F for cooling the turbine blade. As illustrated in FIG. 3, the second cavity C2 communicates with the third cavity C3 in an outer side portion in the radial direction.

The turbulators 41 are provided on an inner wall surface of the cooling flow path F, that is, on an inner surface 40S of the blade main body 40. The turbulators 41 are aligned at intervals along the flow direction of the cooling air in the cooling flow path F. Each of the turbulators 41 has a plate shape projecting from the inner surface 40S of the blade main body 40 and extending in the direction intersecting with the flow direction of the above-mentioned cooling air. The turbulators 41 are formed integrally with the blade main body 40 by casting. The turbulators 41 are alternately provided on the abdominal side (face side on the downstream side of the combustion gas flow) and the back side (face side on the upstream side of the combustion gas flow) of the blade main body 40. That is to say, in the blade main body 40, the turbulators 41 on the abdominal side and the turbulators 41 on the back side do not overlap with each other in the radial direction (blade lengthwise direction) of the gas turbine. On the inner surface 40S, no turbulator 41 is provided on the back side of the blade main body 40 at a position at which the turbulator 41 is provided on the abdominal side thereof in the radial direction of the gas turbine. On the inner surface 40S, no turbulator 41 is provided on the abdominal side of the blade main body 40 at a position at which the turbulator 41 is provided on the back side thereof in the radial direction of the gas turbine.

Figure 4:
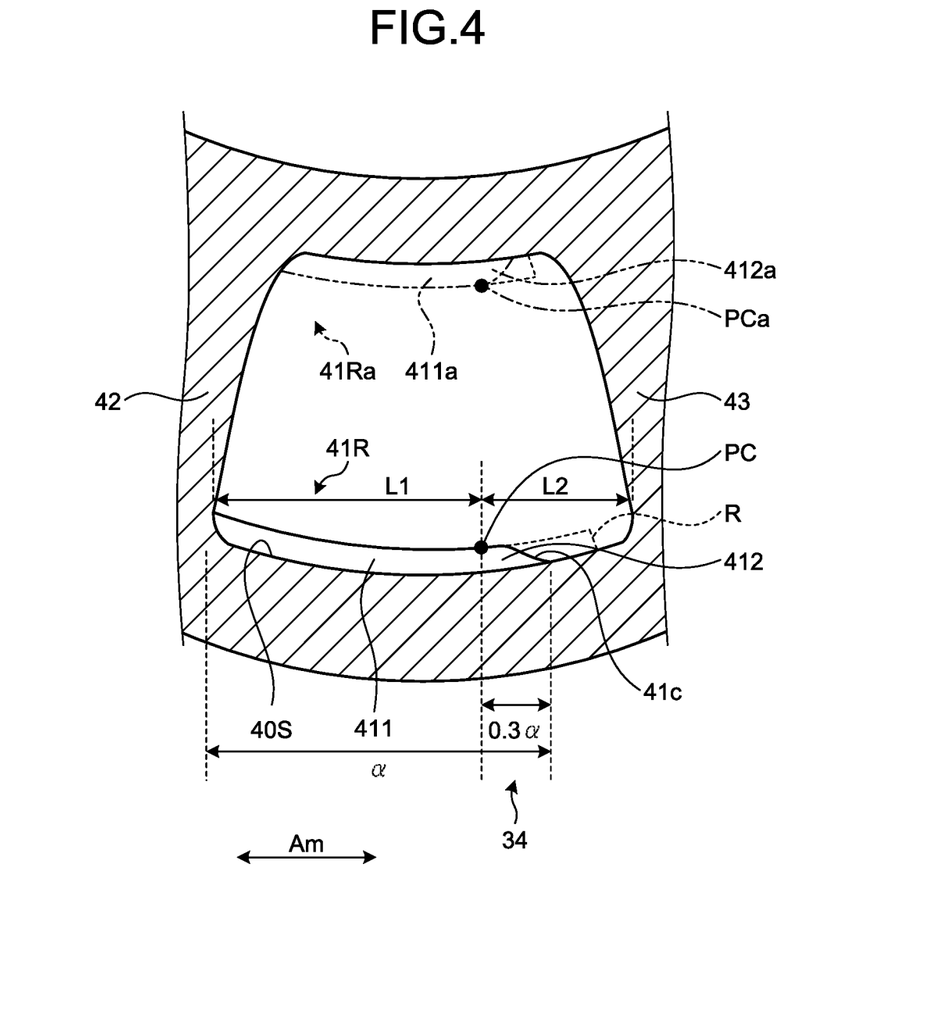
FIG. 4 is a view illustrating the configuration of a first turbulator according to the first embodiment of the present invention.

Inner diameter-side turbulators (first turbulators) 41R located on the innermost side in the radial direction among the turbulators 41 have shapes differing from those of other turbulators (second turbulators) 41A. FIG. 4 illustrates the inner diameter-side turbulator 41R provided in the second cavity C2 in an enlarged manner. FIG. 4 illustrates the case in which the inner diameter-side turbulator 41R is provided on the lower side in the drawing as the back side of the turbine blade. It should be noted that the turbine blade 34 may be provided with inner diameter-side turbulators 41Ra on the abdominal side of the turbine blade. The turbine blade 34 in FIG. 4 includes no inner diameter-side turbulator 41Ra and is therefore indicated by an alternate long and two short dashes line. The turbine blade 34 may be provided with either of or both of the inner diameter-side turbulators 41R and the inner diameter-side turbulators 41Ra depending on an arrangement interval and arrangement positions of the turbulators. The inner diameter-side turbulator 41Ra basically has the same configuration as that of the inner diameter-side turbulator 41R except an arrangement position thereof.

As illustrated in FIG. 4, each inner diameter-side turbulator 41R has a first portion 411 having a projecting height from the inner surface 40S of the blade main body 40 that changes at a first change ratio and a second portion 412 having a projecting height that changes at a second change ratio along the direction intersecting with the flow direction of the cooling air. The second change ratio is higher than the first change ratio. The change ratio is a ratio at which the projecting height changes in a predetermined length. In the embodiment, the first change ratio is 0. That is to say, the first portion 411 has the constant projecting height from the inner surface 40S. It should be noted that the first change ratio may not be necessarily 0 and may be equal to or larger than 0. One end portion of the first portion 411 in the extension direction (direction intersecting with the flow direction of the cooling air) is brought into contact with a portion of the inner surface 40S that configures the partition wall and the other end portion thereof is brought into contact with the second portion 412. The first portion 411 may be brought into contact with a portion of the inner surface 40S that configures the leading edge or the trailing edge. The projecting height of the first portion 411 from the inner surface 40S of the blade main body 40 is constant. The inner diameter-side turbulator 41Ra also has a first portion 411a and a second portion 412a.

One end portion of the second portion 412 is brought into contact with the first portion 411 with a connection point PC interposed therebetween. One end portion of the second portion 412a is also brought into contact with the first portion 411a with a connection point PCa interposed therebetween. The projecting height of the second portion 412 gradually decreases as being farther from the first portion in the extension direction. The projecting heights of the second portions 412 of the inner diameter-side turbulators 41R provided in the respective cavities gradually decrease or increases from the one side toward the other side in the axial line Am direction. In the embodiment, the projecting heights of the second portions 412 of the inner diameter-side turbulators 41R provided in the first cavity C1 and the third cavity C3 gradually increase from the one side toward the other side in the axial line Am direction. The projecting heights of the second portions 412 of the inner diameter-side turbulators 41R provided in the second cavity C2, the fourth cavity C4, and the fifth cavity C5 gradually decrease from the one side toward the other side in the axial line Am direction. The example of FIG. 4 illustrates the configuration of the inner diameter-side turbulator 41R provided in the second cavity C2.

The second portion 412 is continuously connected to the first portion 411 with a smooth curve. That is to say, the second portion 412 is curved in the direction of being brought close to the inner surface 40S as being farther from the first portion 411. The end portion of the second portion 412 on the trailing edge 40T side is connected to the inner surface 40S of the blade main body 40 with a continuous curve. To be more specific, the edge of the second portion 412 (that is, the edge thereof on the side farther from the inner surface 40S) forms a circular arc shape being tangent to the inner surface 40S. In other words, the second portion 412 is curved in the direction of being gradually brought close to the inner surface 40S as the second portion 412 is closer to the partition wall 43 side from the first portion 411, and then, the curving direction changes at an inflection point 41C as a boundary and the second portion 412 is curved in the direction of being tangent to the inner surface 40S. Accordingly, the inner diameter-side turbulator 41R has no corner portion from the leading edge 40L side to the trailing edge 40T side. When the length of the inner diameter-side turbulator 41R in the axial line Am direction is $\alpha$, the length of the second portion 412 is desirably equal to or smaller than $0.3\alpha$, and more desirably equal to or larger than $0.1\alpha$ and equal to or smaller than $0.2\alpha$. When the partition wall 42 close to the first portion 411 is a first partition wall 42 and the partition wall 43 close to the second portion 412 is a second partition wall 43, a distance L2 between the second partition wall 43 and the connection point PC of the second portion 412 is set to be larger than the half of a distance L1 between the first partition wall 42 and the connection point PC.

Figure 5:
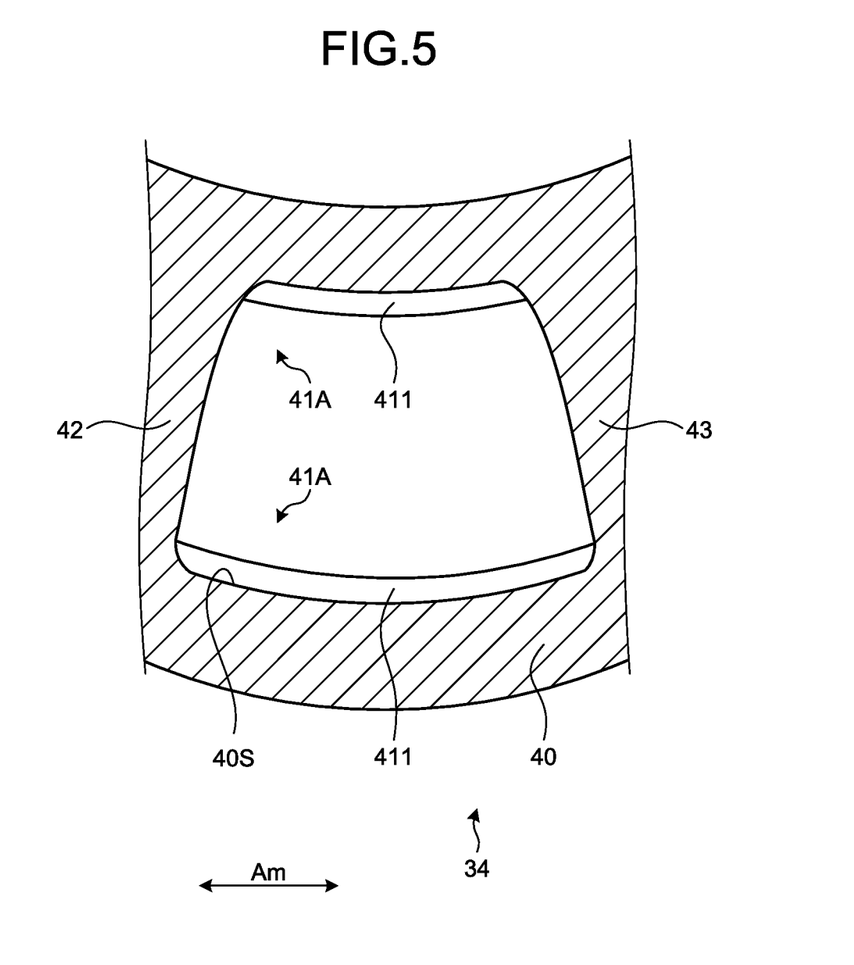
FIG. 5 is a view illustrating the configuration of a second turbulator according to the first embodiment of the present invention.

Both end portions of the turbulators 41A other than the inner diameter-side turbulators 41R in the extension direction (direction intersecting with the flow direction of the cooling air) are brought into contact with portions of the inner surface 40S that configure the partition walls and portions of the inner surface 40S that configure the leading edge or the trailing edge. To be specific, the turbulators 41A provided in the first cavity C1 connect the inner surface 40S of the blade main body 40 on the leading edge 40L side and the partition wall 42. The turbulators 41A provided in the second cavity C2 connect the partition wall 42 and the partition wall 43. The turbulators 41A provided in the third cavity C3 connect the partition wall 43 and the partition wall 44. The turbulators 41A provided in the fourth cavity C4 connect the partition wall 44 and the partition wall 45. The turbulators 41A provided in the fifth cavity C5 connect the partition wall 45 and the inner surface 40S on the trailing edge 40T side.

The turbulators 41A other than the inner diameter-side turbulators 41R in the embodiment have the constant projecting heights from the inner surface 40S of the blade main body 40 over the entire area in the extension direction of the turbulators 41A. That is to say, the turbulators 41A have the constant projecting heights over the blade chord direction of the turbine blade 34 in the divisions of the first cavity C1, the second cavity C2, the third cavity C3, the fourth cavity C4, and the fifth cavity C5. In other words, the other turbulators 41A have the constant projecting heights from the inner surface 40S over the entire area in the extension direction of the outer surface 40R of the blade main body 40. The constant projecting height referred herein indicates a substantially constant projecting height and may have slight manufacturing errors and the like. It is sufficient that the other turbulators 41A have the substantially constant projecting heights, and the projecting heights thereof may vary on end portions thereof on which irregularities of the inner surface tend to vary. Furthermore, the edges of the inner diameter-side turbulator 41R and the other turbulators 41A on the inner surface 40S side are parallel to each other and the edges thereof on the side farther from the inner surface 40S are not parallel to each other.

Most of the turbine blade 34 including the end portion thereof on the outer side in the radial direction is exposed into the fluid flow path A through which the working fluid flows. That is to say, most of the turbine blade 34 is located on the outer side in the radial direction relative to the gas path face G. In FIG. 3, the fluid flow path A is located in a region on the outer side in the radial direction of the axial line Am relative to a dashed line. To be more specific, only the first portions 411 of the inner diameter-side turbulators 41R overlap with the fluid flow path A and the second portions 412 thereof are located on the inner side in the radial direction relative to the fluid flow path A when seen from the direction (radial direction of the axial line Am) intersecting with the flow direction of the cooling air. The second portions 412 on the side opposite to the inflection points 41C are close to the gas path face G of the platform P. The turbine blade 34 may include another cooling flow path including no first turbulator R. In this case, at least a portion of the other turbulator 41A may be exposed to the inner side in the radial direction relative to the gas path face G.

In configuring the turbulators 41 in the turbine blade 34, precision casting is generally used. In the viewpoint of ensuring cooling performance, all of the turbulators 41 are desirably formed continuously from the leading edge 40L side to the trailing edge 40T side. However, it can be difficult to form some turbulators 41 continuously from the leading edge 40L side to the trailing edge 40T side due to limitations on the shape of a core that is used for casting. When it is difficult to form the turbulators 41 continuously, conventionally, cutouts having linear corner portions R are generally provided on the turbulators 41 (part indicated by a dashed line in FIG. 4). However, when the above-mentioned cutouts having the corner portions are formed, stress is concentrated on the corner portions R by centrifugal force with high-speed rotation of the rotor. Thus, the corresponding parts can be lowered in strength in comparison with the other turbulators.

On the other hand, in the turbine blade 34 according to the embodiment, the second portions 412 of the inner diameter-side turbulators 41R have the projecting heights from the inner surface 40S that gradually changes along the direction intersecting with the flow direction. No corner portion R is therefore formed on the inner diameter-side turbulators 41R. The stress concentration on the turbulators 41 can thereby be reduced. That is to say, the design strength of the turbine blade 34 can be sufficiently ensured.

In the above-mentioned configuration, the second portions 412 have the circular arc shapes tangent to the inner surface 40S when seen from the flow direction. With this configuration, the stress concentration on the inner diameter-side turbulators 41R can be further reduced.

In the above-mentioned configuration, the first portions 411 and the second portions 412 of the inner diameter-side turbulators 41R are connected in the curved form. With this configuration, the first portions 411 and the second portions 412 are connected in the curved form and no corner portion is therefore formed on the connected portions. The stress concentration on the inner diameter-side turbulators 41R can thereby be reduced.

In the above-mentioned configuration, the turbulators 41 (inner diameter-side turbulators 41R) located at the positions closest to the one side in the flow direction among the turbulators 41 have the first portions 411 and the second portions 412.

There are cases where cutouts are formed in the turbulators 41 located at the positions closest to the one side in the flow direction, that is, at the innermost side in the radial direction of the turbine 3 among the turbulators 41 because of limitations on a manufacturing process. With the above-mentioned configuration, the cutouts can be formed without forming no corner portion on the turbulators 41, so that the stress concentration on the turbulators 41 can be reduced and the limitations on the manufacturing process can also be satisfied.

In the above-mentioned configuration, only the first portions 411 of the turbulators 41 are provided at the positions overlapping with the fluid flow path A. That is to say, the first portions 411 having the larger projecting heights than the second portions are located in portions that need to be positively cooled because the portions are brought into contact with the working fluid in the fluid flow path A. With this configuration, the cooling effect by the turbulators 41 can be sufficiently ensured and the stress concentration on the turbulators 41 can be reduced by the second portions 412.

As described above, the first embodiment of the present invention has been described with reference to the drawings. It should be noted that various changes can be performed on the above-described configuration without departing from the gist of the present invention.

Second Embodiment

Figure 6:
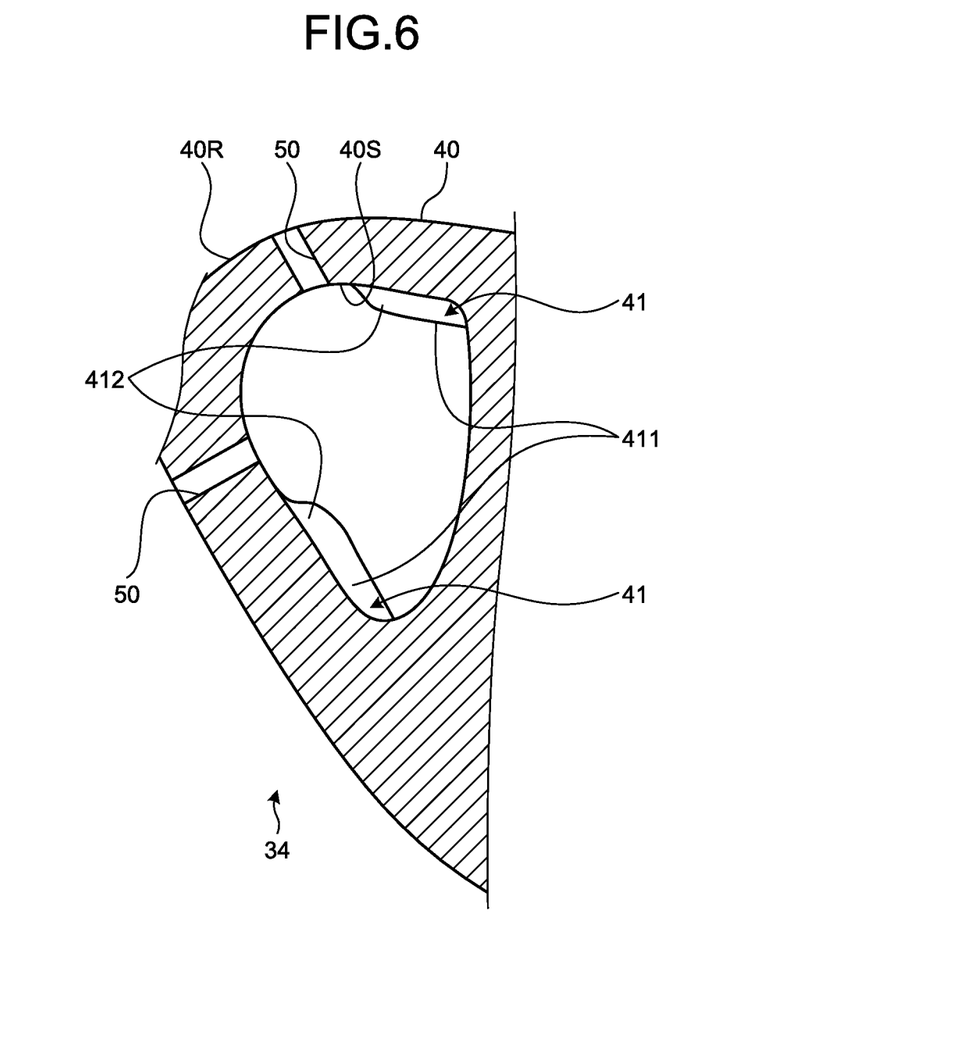
FIG. 6 is a cross-sectional view illustrating the configuration of a turbine blade according to a second embodiment of the present invention.

A second embodiment of the present invention will be described with reference to FIG. 6. As illustrated in FIG. 6, in the embodiment, a plurality of cooling holes 50 are formed in the blade main body 40 of the turbine blade 34. Among the turbulators 41, the turbulators 41 have the above-mentioned first portions 411 and second portions 412.

To be specific, the cooling holes 50 penetrate through the inner surface 40S and the outer surface 40R of the blade main body 40. With the cooling holes 50, a part of the cooling air flowing in the cooling flow path F is ejected from the inner surface 40S side toward the outer surface 40R side through the cooling holes 50. The ejected cooling air flows along the outer surface 40R to thereby cool the turbine blade 34 also from the outer surface 40R side.

The turbulators 41 are provided also at positions on the inner surface 40S side that correspond to the positions of the cooling holes 50. Interference between the turbulators 41 and the cooling holes 50 need to be therefore avoided. Conventionally, interference between the turbulators 41 and the cooling holes 50 is avoided by providing cutouts having linear corner portions on the turbulators 41. However, when the above-mentioned cutouts having the corner portions are formed, stress is concentrated on the corner portions by centrifugal force with high-speed rotation of the rotor. Thus, the corresponding parts can be lowered in strength.

In contrast, in the turbine blade 34 according to the embodiment, the turbulators located at the positions corresponding to the cooling holes 50 have the above-mentioned first portions 411 and second portions 412. The projecting heights of the second portions 412 from the inner surface 40S gradually changes along the direction intersecting with the flow direction, so that no corner portion is formed on the turbulators 41. The stress concentration on the turbulators 41 can thereby be reduced. That is to say, the stress concentration on the turbulators 41 can be reduced and the turbine blade 34 can be cooled through the cooling holes 50.

As described above, the second embodiment of the present invention has been described with reference to the drawing. It should be noted that various changes can be performed on the above-described configuration without departing from the gist of the present invention. As in the above-mentioned first embodiment, the first portions 411 and the second portions 412 may be connected with smooth curves, for example. The end portions of the second portions 412 on the trailing edge 40T side may be connected to the inner surface 40S of the blade main body 40 with a continuous curve. To be more specific, the edges of the second portions 412 (that is, the edges on the side farther from the inner surface 40S) form circular arc shapes being tangent to the inner surface. In other words, the turbulators 41 have no corner portion from the leading edge 40L side to the trailing edge 40T side.

REFERENCE SIGNS LIST

100 GAS TURBINE
1 COMPRESSOR
2 COMBUSTOR
3 TURBINE
11 COMPRESSOR ROTOR
12 COMPRESSOR CASING
13 COMPRESSOR BLADE STAGE
14 COMPRESSOR BLADE
15 COMPRESSOR VANE STAGE
16 COMPRESSOR VANE
31 TURBINE ROTOR
32 TURBINE CASING
33 TURBINE BLADE STAGE
34 TURBINE BLADE
35 TURBINE VANE STAGE
36 TURBINE VANE
40 BLADE MAIN BODY
40L LEADING EDGE
40R OUTER SURFACE
40S INNER SURFACE
40T TRAILING EDGE
41 TURBULATOR
41R INNER DIAMETER-SIDE TURBULATOR
42, 43, 44, 45 PARTITION WALL
50 COOLING HOLE
411 FIRST PORTION
412 SECOND PORTION
C1 FIRST CAVITY
C2 SECOND CAVITY
C3 THIRD CAVITY
C4 FOURTH CAVITY
C5 FIFTH CAVITY
A FLUID FLOW PATH
AM AXIAL LINE
G GAS PATH FACE
P PLATFORM

The invention claimed is:

1. A turbine blade comprising:
a blade main body that includes a cooling flow path formed inside, through which a cooling medium flows;
a platform that defines a gas path face, the gas path face being a radial face of a gas path; and
a plurality of turbulators that are aligned in a flow direction of the cooling medium, project into the cooling flow path from an inner surface of the blade main body, and extend in a direction intersecting with the flow direction, wherein
at least one of the turbulators is a first turbulator,
the first turbulator includes a first portion and a second portion, the first portion having a projecting height from the inner surface that changes at a first change ratio along a direction intersecting with the flow direction, the second portion having a connection point at which one end of the second portion is connected to the first portion and having a projecting height from the inner surface that changes at a second change ratio higher than the first change ratio along the direction intersecting with the flow direction,
the first change ratio of the first portion is 0 or has a value indicating that the projection height decreases as being closer to the second portion, and
at least a portion of the second portion of the first turbulator is located radially inward of the gas path face when seen from the direction intersecting with the flow direction, and at least a portion of the first portion of the first turbulator is located radially outward of the gas path face when seen from the direction intersecting with the flow direction.

2. The turbine blade according to claim 1, wherein the projecting height of the second portion decreases as being farther from the first portion.

3. The turbine blade according to claim 1, wherein an edge of the second portion on a side opposite to the inner surface forms a circular arc shape being tangent to the inner surface when seen from the flow direction.

4. The turbine blade according to claim 1, wherein the first portion and the second portion of the first turbulator are connected to each other in a curved form.

5. The turbine blade according to claim 1, wherein the first turbulator is the turbulator located at a position closest to one side in the flow direction among the turbulators.

6. The turbine blade according to claim 1, wherein second turbulators other than the first turbulator among the turbulators each have a constant projecting height from the inner surface along the direction intersecting with the flow direction.

7. The turbine blade according to claim 6, wherein edges of the first turbulator and each of the second turbulators on the inner surface side are parallel to each other and edges of the first turbulator and each of the second turbulators on a side farther from the inner surface are not parallel to each other.

8. The turbine blade according to claim 1, wherein
the blade main body includes a plurality of partition walls dividing the cooling flow path into a plurality of cavities,
the plurality of turbulators includes second turbulators other than the first turbulator, and
wherein for each second turbulator, opposite ends of the second turbulator are respectively connected
to adjacent ones of the partition walls, or
to the inner surface of the blade main body on a leading edge side and to an adjacent one of the partition walls, or to the inner surface on a trailing edge side and to an adjacent one of the partition walls.

9. The turbine blade according to claim 1, wherein the blade main body includes a plurality of partition walls dividing the cooling flow path into a plurality of cavities, the partition walls include a first partition wall close to the first portion and a second partition wall close to the second portion, and a distance between the second partition wall and the second portion is larger than half of a distance between the first partition wall and the connection point.

10. The turbine blade according to claim 1, wherein the cooling flow path is a first cooling flow path, the blade main body has a second cooling flow path which includes turbulators projecting into the second cooling flow path, the turbulators of the second cooling flow path including no first turbulator, and at least a portion of the turbulators in the second cooling flow path is located at a position on the inner side in the radial direction relative to the gas path face which is a radial face of a gas path.

11. A turbine comprising:

a rotor main body that rotates about an axial line; and the turbine blade according to claim 1 that is provided on the rotor main body.

12. A method for cooling a turbine blade, the turbine blade including:

a blade main body that includes a cooling flow path formed inside, through which a cooling medium flows;

a platform that defines a gas path face, the gas path face being a radial face of a gas path; and a plurality of turbulators that are aligned in a flow direction of the cooling medium, project into the cooling flow path from an inner surface of the blade main body, and extend in a direction intersecting with the flow direction, at least one of the turbulators being a first turbulator, the first turbulator including a first portion and a second portion, the first portion having a projecting height from the inner surface that changes at a first change ratio along a direction intersecting with the flow direction, the second portion having a connection point at which one end of the second portion is connected to the first portion and having a projecting height from the inner side that changes at a second change ratio higher than the first change ratio along the direction intersecting with the flow direction, the first change ratio of the first portion being 0 or having a value indicating that the projection height decreases as being closer to the second portion, and at least a portion of the second portion of the first turbulator being located radially inward of the gas path face when seen from the direction intersecting with the flow direction, and at least a portion of the first portion of the first turbulator being located radially outward of the gas path face when seen from the direction intersecting with the flow direction, the method comprising:

cooling the blade main body by causing cooling air to flow through the cooling flow path; and performing heat exchange between the blade main body and the cooling air while changing a flow direction of the cooling air by the first turbulator and second turbulators other than the first turbulator, to cool the turbine blade.

* * * * *